(12) United States Patent
Kummerl et al.

(10) Patent No.: US 9,378,882 B2
(45) Date of Patent: Jun. 28, 2016

(54) METHOD OF FABRICATING AN ELECTRONIC CIRCUIT

(75) Inventors: Steven Kummerl, Carrollton, TX (US); Richard J. Saye, Greenville, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1098 days.

(21) Appl. No.: 13/328,665

(22) Filed: Dec. 16, 2011

(65) Prior Publication Data

US 2013/0154148 A1 Jun. 20, 2013

(51) Int. Cl.
*B29C 45/14* (2006.01)
*H01F 17/04* (2006.01)
*B29C 45/00* (2006.01)
*H01F 41/02* (2006.01)
*H01F 27/28* (2006.01)

(52) U.S. Cl.
CPC ............ *H01F 17/04* (2013.01); *B29C 45/0001* (2013.01); *B29C 45/14639* (2013.01); *B29K 2995/0008* (2013.01); *H01F 41/0246* (2013.01); *H01F 2017/048* (2013.01); *H01F 2027/2814* (2013.01)

(58) Field of Classification Search
None
See application file for complete search history.

(56) References Cited

U.S. PATENT DOCUMENTS

| 3,243,752 | A | * | 3/1966 | Lawrence | 336/205 |
|---|---|---|---|---|---|
| 3,255,512 | A | * | 6/1966 | Lochner et al. | 29/602.1 |
| 3,675,174 | A | * | 7/1972 | Horbach | 335/299 |
| 3,848,208 | A | * | 11/1974 | Dawson et al. | 336/96 |
| 5,846,477 | A | * | 12/1998 | Hotta et al. | 264/511 |
| 6,103,157 | A | * | 8/2000 | Behm et al. | 264/102 |
| 6,682,681 | B1 | * | 1/2004 | Clark et al. | 264/263 |
| 7,219,416 | B2 | * | 5/2007 | Inoue et al. | 29/606 |
| 7,265,651 | B2 | * | 9/2007 | Brunner | H01F 27/255 336/233 |
| 7,300,615 | B1 | * | 11/2007 | Sanchez et al. | 264/263 |
| 7,532,099 | B2 | * | 5/2009 | Brunner | G08B 13/2402 336/83 |
| 7,871,864 | B2 | * | 1/2011 | Huckabee | H01L 21/565 257/787 |
| 8,327,524 | B2 | * | 12/2012 | Brunner | H01F 27/255 29/602.1 |
| 8,466,764 | B2 | * | 6/2013 | Bogert | H01F 5/003 336/83 |
| 2007/0087079 | A1 | * | 4/2007 | Murugan | B29C 45/2708 425/572 |

FOREIGN PATENT DOCUMENTS

GB 1428616 * 3/1976

OTHER PUBLICATIONS

Jian Lu, Hongwei Jia, Andres Arias, Xun Gong, and Z. John Shen, "On-Chip Bondwire Magnetics With Ferrite-Epoxy Glob Coating for Power Systems on Chip," Hindawi Publishing Corporation, International Journal of Power Management Electronics, vol. 2008, Article ID 678415, 9 pages.

* cited by examiner

*Primary Examiner* — Edmund Lee
(74) *Attorney, Agent, or Firm* — Steven A. Shaw; Frank D. Cimino

(57) ABSTRACT

Circuits and methods of fabricating circuits are disclosed herein. A method of fabricating an electronic circuit includes placing an electronic component on a substrate. A ferromagnetic material is mixed into a mold compound to produce a mixed mold compound having an increased permeability over the mold compound. The mixed mold compound is applied to the substrate by way of a transfer mold process, wherein the mixed mold compound encapsulates the electronic component.

14 Claims, 2 Drawing Sheets

METHOD OF FABRICATING AN ELECTRONIC CIRCUIT

BACKGROUND

Many electronic components function better when they are located in the proximity of a magnetic or ferromagnetic material. For example, an inductor made of a coil in free space is able to store only a relatively small amount of energy due to the low permeability of free space. However, when a ferromagnetic material, which has a much greater permeability than free space, is placed within the coil, the inductor can store much more energy.

Encapsulated electronic component assemblies with increased permeability are conventionally produced by placing ferromagnetic materials proximate the electronic components. The ferromagnetic materials are typically placed proximate the electronic components by way of a pick and place process or by way of an electroplating process. For example, sintered ferromagnetic material is placed in the core of a coil to improve the inductance of the coil. The coil, including the ferromagnetic material is then encapsulated.

The pick and place process and the electroplating process are very time consuming and increase production costs.

DETAILED DESCRIPTION

Figure 1:
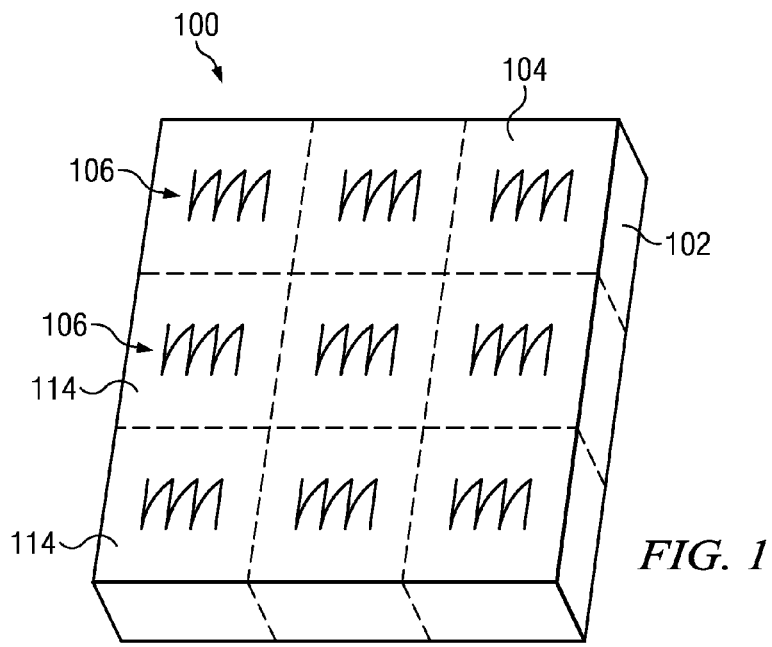
FIG. 1 is an isometric view of a substrate having a plurality of inductors located thereon.

Many circuits and electronic devices function better in the presence of ferromagnetic materials. Ferromagnetic materials are sometimes referred to as high permeability materials. With regard to inductors, a coil in free space functions as an inductor, but due to the low permeability of free space, the coil cannot store much energy and the resulting inductance is usually low. However, when a ferromagnetic material is inserted into the coil, the permeability of the space within the coil increases. It follows that the coil can store more energy. Accordingly, the inductance of the coil with a ferromagnetic core is greater than an identical coil having a free space core. Circuits are disclosed herein that are encapsulated with mold compounds having ferromagnetic materials dispersed throughout. These circuits operate in high permeability space and, thus, operate better than conventional circuits that operate in free space. Methods for making such circuits are also disclosed.

Ferromagnetic materials are used in many circuit applications. For example, ferromagnetic materials are commonly placed around conductors in communications circuits to increase the inductance of the conductors. By increasing the inductance of a conductor, the ability of the conductor to transmit signals is enhanced. Ferromagnetic material may also be used proximate conductors in power circuits in order to attenuate voltage spikes.

Ferromagnetic materials include, the following materials, which are listed with their maximum relative permeability in parenthesis: ferrite M33 (750); nickel (600); ferrite N41 (3000); iron (5000); ferrite T38 (10,000); silicon GO steel (40,000); and supermalloy (1,000,000). It is noted that this is only a partial list.

The flux density (B) of the above listed ferromagnetic materials are at least ten times higher than the flux density of a conventional mold compound material when exposed to the same field strength (H). For example, in one embodiment the flux density of the ferromagnetic material is approximately 0.4 Tesla when in a field of approximately 100 amps/meter. The permeability is approximately 0.004 and the relative permeability is approximately 3,200.

As described in greater detail below, ferromagnetic material may be ground or atomized into powder that is added to a conventional transfer mold compound, referred to herein simply as "mold compound." The addition of ferromagnetic material provides a mixed mold compound, which has an increased permeability over that of the original mold compound. The permeability of such mixed mold compound depends on the particle size of the powdered ferromagnetic material, the density of the ferromagnetic material, and many other known factors. By changing the particle size and density of the ferromagnetic material, the permeability of the mixed mold compound can be selected to fit specific design criteria. For example, smaller particle sizes yield lower permeability of the mixed mold compound, but the particles may be more easily dispersed in the mixed mold compound than larger particles. In some embodiments, the individual powder particles are insulated from one another, which allows the mixed mold compound to have inherently distributed gaps for energy storage, which increases the permeability of the mixed mold compound. In one embodiment, the relative permeability of the mixed mold compound is at least ten. In other embodiments, the addition of the ferromagnetic material to the mold compound increases the relative permeability of the resulting mold compound by a factor of at least ten. In yet another embodiment, the addition of the ferromagnetic material to the mold compound increases the relative permeability of the resulting mold compound by a factor of at least one hundred.

In one embodiment, the ferromagnetic material is sendust, which is approximately 85% iron, 9% silicon and 6% aluminum and has a relative permeability of up to 140,000. The above-described materials are mixed together and then formed into a powder, wherein the particles in the powder can have different sizes depending on the application. In other embodiments, versions of permalloy may be used as the ferromagnetic material. Permalloys may have different concentrations of nickel and iron. In one embodiment, the permalloy consists of approximately 20% nickle and 80% iron. Variations of permalloy may change the ratios of nickel and iron to 45% nickel and 55% iron. Other ferromagnetic materials include molybdenum permalloy which is an alloy of approximately 81% nickel, 17% iron and 2% molybdenum. Copper may be added to molybdenum permalloy to produce supermalloy which has approximately 77% nickel, 14% iron, 5% copper, and 4% molybdenum.

Having described some of the ferromagnetic materials that may be used in a mixture with the mold compounds, the circuits which may be encapsulated with such mold compounds will now be described.

Circuits and methods of making circuits are described below wherein the circuits are encapsulated with a mold compound having the above-described ferromagnetic material dispersed throughout the mold compound. The ferromagnetic material serves to increase the permeability in the space proximate components in the circuit. The increased permeability improves the performance of many components on the circuit. Many of the improvements come from an increased inductance provided by the proximity of the components to the ferromagnetic material. For example, the increased permeability increases the inductance of inductors and conductors. Increased permeability also improves signal transmission properties of many conductors.

Figure 2:
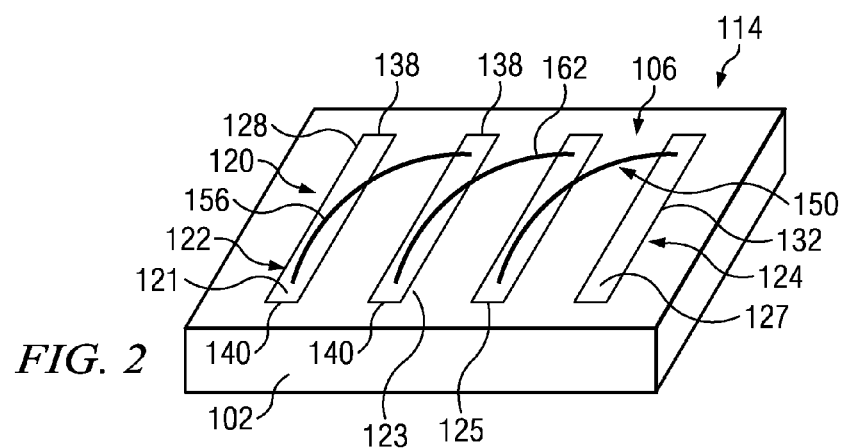
FIG. 2 is an isometric view of one of the inductors of FIG. 1.
Figure 3:
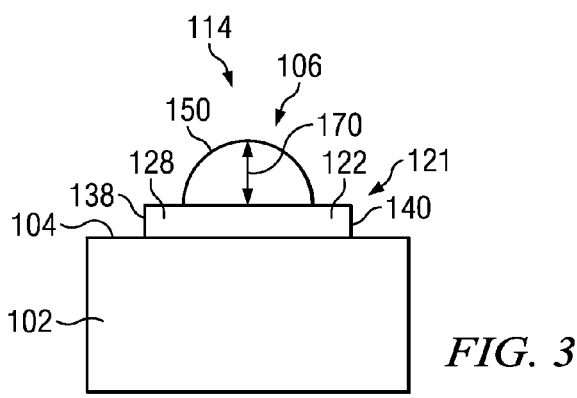
FIG. 3 is a side elevation view of the inductor of FIG. 2.
Figure 4:
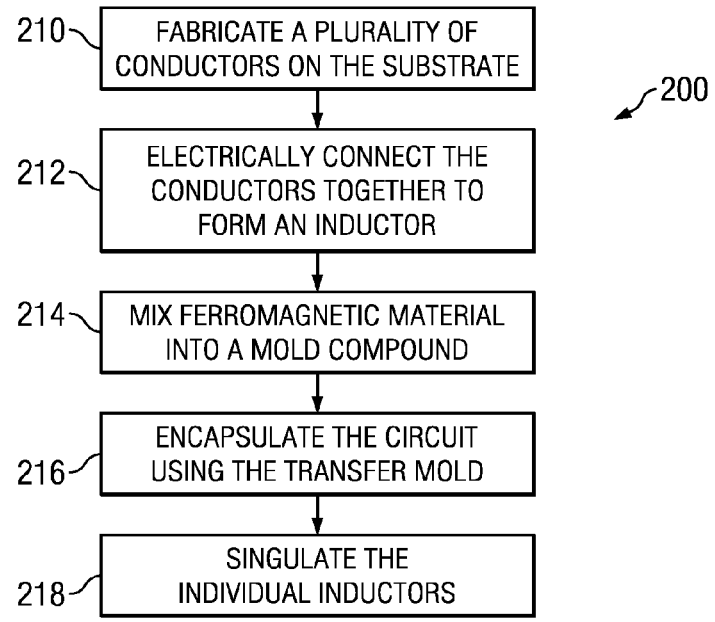
FIG. 4 is a flow chart illustrating an embodiment of a method of fabricating a plurality of electronic components.

A circuit and a process of fabricating a circuit encapsulated with the above-described mixed mold compound will now be described. Reference is made to FIGS. 1-4. FIG. 1 is an isometric view of a partially completed circuit 100. FIGS. 2 and 3 are views of individual components located on the circuit 100. More specifically, FIG. 2 is an isometric view of an individual inductor assembly 114 and FIG. 3 is a side elevation view of the inductor assembly 114. The inductor assembly 114 includes a coil 106 attached to a substrate 102. FIG. 4 is a flow chart of a method for fabricating individual inductor assemblies 114.

The circuit 100 includes a substrate 102 having a surface 104 on which a plurality of electronic components 106 are located. In the embodiment of FIG. 1, the electronic components 106 are coils. The coils 106 function as inductors and are sometimes referred to herein as inductors 106. As described in greater detail below, the substrate 102 is encapsulated and singulated to form individual inductor assemblies 114 wherein each of the inductor assemblies 114 includes a portion of the substrate 102 and a coil 106.

Referring to FIG. 2, the process of fabricating the inductor assemblies 114 commences with applying a plurality of conductors 120 to the surface 104 of the substrate 102 as described in step 210 of FIG. 4. In the embodiments of the inductor assembly 114 described herein, the coil 106 has four conductors 120, which are referred to individually as a first conductor 121, a second conductor, 123, a third conductor 125, and a third conductor 127. The conductors 120 may be applied by any conventional technique for applying conductors to a substrate. The conductors 120 may be substantially parallel to each other as shown in FIG. 2. The layout of the conductors 120 forms the boundaries of the coils 106. Each coil 106 has a first end 122 and a second end 124. The first end 122 is defined as the outer edge 128 of the first conductor 121. In the embodiment of FIGS. 2 and 3 where each coil 106 has four conductors 120, the second end 124 of the coil 106 is defined by an outer edge 132 of the fourth conductor 127. Each of the conductors 120 has a first end 138 and a second end 140. The ends 138, 140 also form boundaries of the coil 106.

After the conductors 120 are applied to the substrate 102, wire bonds 150 are connected to the conductors 120 so as to electrically connect the conductors 120 to each other as described in step 212 of the flow chart 200. As shown in FIG. 2, the second end 140 of the first conductor 121 is connected to the first end 138 of the second conductor 123 by a first wire bond 156. The second end 140 of the second conductor 154 is electrically connected to the first end 140 of the third conductor 125 by a second wire bond 162. This electrical connection scheme continues for the length of the coil 106. The conductors 120 and the wire bonds 150 at least partially define the coil 106.

As shown in FIG. 3, the wire bonds 150 form arcs spaced a distance 170 from the surface 104 of the substrate 110. The arcs each form a space between the wire bonds 150 and the conductors 120. In some embodiments, the distance 170 is approximately 120 mils (0.12 inches) or approximately 3.1 millimeters. As briefly described above, a mold compound with the above-described ferromagnetic material dispersed throughout encapsulates the coil 105. Accordingly, the distance 170 has to be great enough to allow the mold compound with the ferromagnetic material dispersed throughout to pass between the wire bonds 150 and the conductors 120.

It is noted that the inductance of the coil 106 and thus, the inductor assembly 114, is dependent on the length and width of the coil 106, the distance 170 between the conductors 120 and the wire bonds 150, the number of wire bonds 150 or windings in the coil 106, and several other factors, including the mold compound and the ferromagnetic material dispersed throughout the mold compound. The mixed mold compound is able to be located between the wire bonds 150 and the conductors 120. Because the mixed mold compound includes ferromagnetic material, the permeability of the space proximate the coil 106 is improved over a coil having air or just a mold compound located therein.

With additional reference to FIG. 1, at this point in the fabrication process, the substrate 102 has a plurality of coils 106 located thereon. Components in addition to the coils 106 or instead of the coils 106 may be located on the substrate 102. There is a space between the wire bonds 150 and the conductors 120 on the surface 104 of the substrate 102. If other discrete components are located on the surface 104 of the substrate 102, they may be electrically connected to the substrate 102 by way of wire bonds, traces, and/or other conductors located on the substrate 102. Accordingly, the aforementioned mixed mold compound having ferromagnetic material dispersed throughout is able to encapsulate such conductors and increase the inductance associated with all the conductors and components located on the substrate 102.

As indicated at step 214 of FIG. 4, a ferromagnetic material as described above is mixed into a conventional mold compound that is used to encapsulate the circuit 100 of FIG. 1. The mixed mold compound has at least two components, one component is a conventional encapsulant or mold compound and another component is the ferromagnetic material that has a higher permeability than the conventional mold compound. In some embodiments, the ferromagnetic material is fifteen percent of the overall weight of the mixed mold compound. In other embodiments, the ferromagnetic material is ten percent of the weight of the mixed mold compound.

The conventional mold compound may be a polymer, monomer, or other conventional material and may be made by pelletizing fine powder of a mixture of resin, filler, hardener, catalyst, carbon black, and other materials. Conventionally, the transfer mold compound is in a powdered or solid form and is placed in a pot where heat and pressure are applied to the transfer mold compound. The heat and pressure cause the transfer mold compound to change to a fluid state. In the fluid state, the transfer mold compound may be injected into a cavity to encapsulate a circuit. The transfer mold compound eventually solidifies to form a hard casing around the circuit. The conventional mold compound serves to keep contaminants from the components 106 on the substrate 102 and to insulate the components 106 from other electronic devices and may also serve to dissipate heat from the circuit 100.

The ferromagnetic material may be ground or atomized into powder that is added to the conventional mold compound, typically when the conventional mold compound is in a powered state and before it is placed into the pot. In some embodiments, the ferromagnetic material is in the form of particles that are dispersed throughout the mold compound. For example, the above-described sendust may be used as the ferromagnetic material. The use of fine particles of sendust or other ferromagnetic powder materials enables the ferromagnetic materials to flow with the molten mold compound around the bond wires 150 of the inductors 114 or other electronic components that are encapsulated during the molding process. The particles are fine enough to fit within the space between the wire bonds 150 and the conductors 120.

In the embodiments described herein, the circuit 100 is encapsulated per a transfer mold process as described in step 216 of the flow chart 200. Examples of transfer molds and processes of transfer molding are described in U.S. Pat. No. 7,871,864 and United States published patent application 2007/0087079, both of which are incorporated herein.

Figure 5:
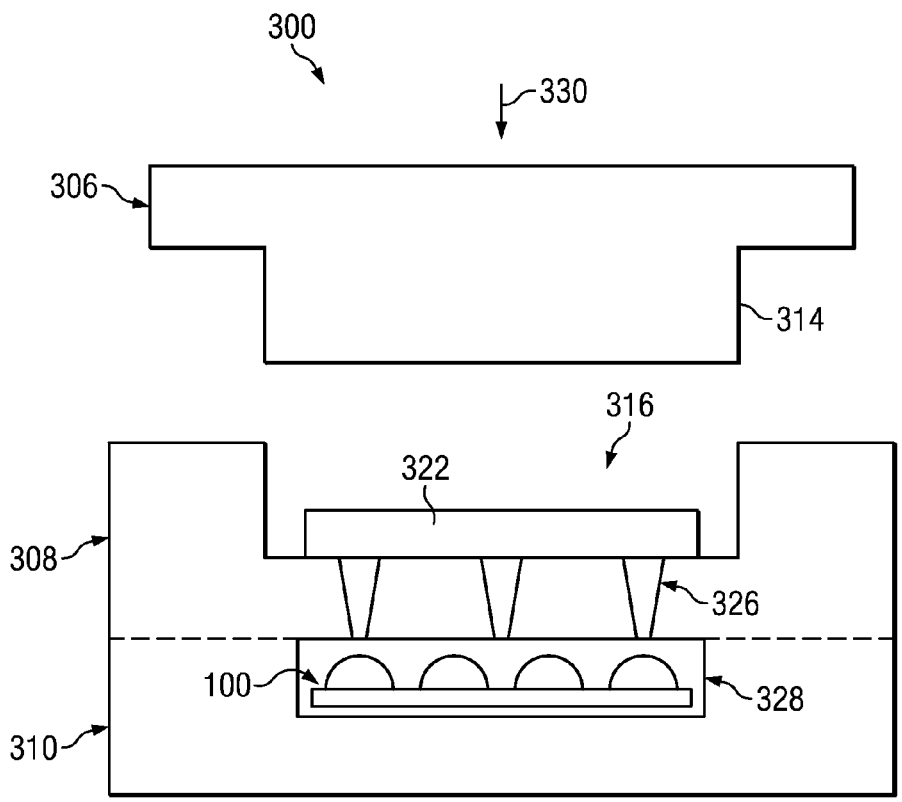
FIG. 5 is a cut away, elevation view of an embodiment of a transfer mold system.

A simplified embodiment of a transfer mold device 300 is shown in FIG. 5. The device 300 includes three plates that are referred to individually as a top plate 306, an intermediate plate 308, and a bottom plate 310. The top plate 306 has a plunger portion 314 that is sized to be received in a cavity or pot 316 in the intermediate plate 308 as described below. The top plate 306 may be connected to a press (not shown) such as a hydraulic press that forces the plunger portion 314 into the pot 316.

The intermediate plate 308 includes the pot 316 that receives the plunger portion 314. In addition, the pot 316 receives an uncured mixed mold compound 322, which is usually in a powdered or solid form. The uncured mixed mold compound 322 has been mixed to include the ferromagnetic material as described above. The intermediate plate 308 may have a plurality of heating elements (not shown) that serve to heat the mixed mold compound 322 in a conventional manner. A plurality of sprues 326 extend from the pot 316 to the bottom plate 310. The sprues 326 are channels or other passages that transfer the mixed mold compound 322 to a mold cavity 328 in the bottom plate 310.

The bottom plate 310 is configured to be removably attached to the intermediate plate 308. During the molding process, the bottom plate 310 is securely attached to the intermediate plate 308 using conventional mechanisms. After the molding process, the bottom plate 310 is removed from the intermediate plate 308 in order to remove the molded pieces. As briefly described above, the mold cavity 328 is located in the bottom plate 310. The mold cavity 328 is in the shape of the final product, which in the embodiments described herein may be a substantially box-shaped electronic component. In some embodiments, vent holes may extend to the cavity 328 in order to vent air pockets located in the cavity 328 during the mold process.

Referring briefly to FIG. 4, the circuit 100 is encapsulated at step 216 as described below. The molding process for applying an encapsulant to the circuit 100 commences with separating the bottom plate 310 from the intermediate plate 308. The circuit 100 is placed into the cavity 328 and the intermediate plate 308 is attached to the bottom plate 310. The uncured mixed mold compound 322 with the ferromagnetic material dispersed throughout is placed into the pot 316.

As described above, the mixed mold compound 322 in the pot 316 is not cured. The pot 316 is heated by conventional mechanisms, which heats the mixed mold compound 322. The top plate 306 is applied to the intermediate plate 308 so that the plunger portion 314 extends into the pot 316. Pressure is then applied to the top plate 306 in a direction 330 to compress the mixed mold compound 322. The combination of heat and compression causes the mixed mold compound 322 to enter a relatively low viscosity fluid state and flow through the sprues 326 and into the cavity 328 where it eventually cures and solidifies. The low viscosity of the mixed mold compound in its heated fluid state enables it to fully encapsulate the coils 106, FIG. 3, including the region between the conductors 120 and the wire bonds 150. When the mixed mold compound in the cavity 338 cures, the circuit 100 within the cavity 328 is encapsulated. Upon completion of the curing, the intermediate plate 308 is separated from the lower plate 310 and the encapsulated circuit 100 is removed. Although a basic transfer mold process has been described herein, many variations of this basic transfer mold process may be used to encapsulate circuits with mold compounds mixed with ferromagnetic particles, as will be obvious to those with ordinary skill in the art who have read this disclosure.

The method described above encapsulates the entire circuit 100, which contains several individual inductor assemblies 114. The individual inductor assemblies 114 are then separated or singulated in a conventional manner as described in step 218 of FIG. 4. In other embodiments, the individual inductor assemblies 114 may be singulated prior to encapsulation. Accordingly, the singulation process after encapsulation is not always required.

The use of the above-described transfer mold process enables a plurality of components to be simultaneously encapsulated with a mold compound having a high permeability. The low viscosity of the mixed mold compound enables the several components to be simultaneously encapsulated wherein the mixed mold compound disperses into the coils 106.

In the embodiments described above, the resulting fabrication yields a plurality of inductor assemblies 114. The inductor assemblies 114 are able to be mass produced from a single substrate 102 and are able to have higher inductance due to the ferromagnetic material in the encapsulant. The inductance of the inductor assemblies 114 is greatly enhanced over conventional mass produced inductors. It is noted that the inductance of the inductor assemblies 114 is dependent on the characteristics of the coils 106 in addition to the type of ferromagnetic material used, the density of the ferromagnetic material, the size of the particles used as ferromagnetic material, and other known variables affecting permeability of the ferromagnetic material.

In one embodiment, sufficient ferromagnetic material is added to the mold compound to increase the relative permeability of the mold compound mixture over that of the mold compound before addition of the ferromagnetic material by at least five hundred percent. In another embodiment, the relative permeability of the mold compound after addition of the ferromagnetic material is increased by at least one thousand percent. In another embodiment, the relative permeability of the mold compound with the ferromagnetic material added thereto is at least ten. In one embodiment the ferromagnetic material comprises at least ten percent of the weight of the mixed mold compound. In another embodiment the ferromagnetic material comprises at least fifteen percent of the weight of the mixed mold compound.

It will be appreciated from the above description that a method of encapsulating electronic circuit components has been disclosed that has several significant advantages over prior art encapsulation methods. One advantage is that the disclosed method is much less labor intensive. Electroplating of circuit components with ferromagnetic materials and picking and placing ferromagnetic materials proximate electronic components is completely eliminated. Instead, ferromagnetic materials are placed proximate circuit components by mixing the materials with mold compounds before they are used to encapsulate components. Also, since the ferromagnetic materials are dispersed in a molten transfer mold compound, they flow with the mixed mold compound into small and otherwise hard to access areas on the circuit. For example, the ferromagnetic materials encompass various conductors and wire bonds that where conventional fabrication techniques could not locate ferromagnetic materials. Thus, using the disclosed methodology, ferromagnetic materials may be quickly and efficiently placed around encapsulated electronic components through the use of the encapsulation process itself.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of fabricating an electronic circuit, said method comprising:
    placing an electronic component on a substrate;
    mixing a ferromagnetic material into a mold compound to produce a mixed mold compound having an increased permeability over the mold compound;
    applying said mixed mold compound to said substrate by way of a transfer mold process, wherein said mixed mold compound encapsulates said electronic component.

2. The method of claim 1, wherein said electronic component is a coil.

3. The method of claim 1, wherein said placing an electronic component on a substrate comprises:
    placing a plurality of conductors on said substrate, each of said conductors having a first end and a second end; and
    electrically connecting a first end of a first conductor to a second end of a second conductor with wire bonds so as to form a coil.

4. The method of claim 1, wherein said ferromagnetic material includes iron.

5. The method of claim 1, wherein said ferromagnetic material includes nickel.

6. The method of claim 1, wherein said ferromagnetic material includes aluminum.

7. The method of claim 1, wherein said ferromagnetic material includes molybdenum.

8. The method of claim 1, wherein said ferromagnetic material includes copper.

9. The method of claim 1, wherein said ferromagnetic material comprises at least one of sendust, permalloy, supermalloy, and molybdenum supermalloy.

10. The method of claim 1, wherein the relative permeability of said mixed mold compound is at least five hundred percent greater than the relative permeability of said mold compound.

11. The method of claim 1, wherein the relative permeability of said mixed mold compound is at least one thousand percent greater than the relative permeability of said mold compound.

12. The method of claim 1, wherein said ferromagnetic material comprises at least ten percent of the weight of said mixed mold compound.

13. The method of claim 1, wherein said ferromagnetic material comprises at least fifteen percent of the weight of said mixed mold compound.

14. A method of fabricating inductors, said method comprising:
    forming a plurality of coils on a substrate;
    mixing a ferromagnetic material with a transfer mold compound to provide a mixed transfer mold compound;
    applying said mixed transfer mold compound to said coil via a transfer mold process to encapsulate said plurality of coils; and
    singulating individual ones of the encapsulated coils into individual inductors.

* * * * *